Fig. 2

INVENTOR.
John W. Fox
and
Vincent E. Hart
Harry P. Canfield
Attorney

Fig. 3

United States Patent Office 2,883,036
Patented Apr. 21, 1959

2,883,036

CONVEYOR CONTROLS

John W. Fox and Vincent E. Hart, Cleveland, Ohio, assignors to The Clark Controller Company, Cleveland, Ohio, a corporation of Ohio Application July 12, 1956, Serial No. 597,500

12 Claims. (Cl. 198—82)

This invention relates to conveyors of the assembly line class driven by electric motors, and to electric controls for the motors; and relates particularly to conveyor systems of the following known type.

Two conveyors, in general of the endless belt or chain type are longitudinally aligned, end to end with their ends adjacent, and each driven by its own motor.

The conveyors are to be driven at the same preselected production speed by a control for the motors.

Work pieces on each conveyor are spaced longitudinally therealong and propelled forwardly in unison therewith by suitably spaced upstanding dogs on the conveyors.

When the work piece comes to the forward end of the rearward conveyor it transfers to the rearward end of the forward conveyor. A dog on the rearward conveyor releases the work piece and a dog on the forward conveyor picks it up and resumes its forward propulsion.

In conveyors of this type, while the respective motors drive the conveyors in general at equal speeds, a difference of speed inevitably occurs from time to time in practice.

For example the speed of the rearward conveyor may become less than that of the forward conveyor, either by slowing down, or because the forward conveyor has speeded up.

This will cause the dog on the rearward conveyor that releases the work to lag behind its normal position, and if the lag is more than some predetermined permissible maximum, then when it releases the work piece, the dog on the forward conveyor that is to pick it up, will be too far advanced for it to do so.

It will be apparent that in order for the work to be released and picked up as referred to, the distance longitudinally of any dog on the rearward conveyor from a corresponding one on the forward conveyor must be kept constant or within a maximum permissible range of variation.

A dual problem therefore arises in conveyors of this type; the problem of controlling the speeds of the two conveyors to keep them equal at the desired production speed, when they tend to deviate from equality; and the problem of concurrently controlling their speeds so that their dogs will be maintained at the said distances apart longitudinally.

It is the main object of the present invention to provide a control for the motors of a conveyor of the type referred to that solves this dual problem.

An embodiment of the invention in a conveyor system of the type referred to is described in detail hereinafter, and that embodiment comprises, in general, the following. The actual invention is that set forth in the appended claims.

To simplify this general description it will be assumed that the forward conveyor is driven at a chosen production speed by its own motor; and that it is the rearward conveyor that deviates from equality of conveyor speed and that it does so by slowing down; and it will then be understood how the embodiment functions if the rearward conveyor should deviate from speed equality by going too fast, or if inequality of conveyor speed should come about by change of speed of the forward conveyor.

A D.C. rearward motor drives the rearward conveyor, being supplied with current from a main D.C. generator, driven at constant speed by a substantially constant speed motor, for example an induction motor.

The generator has a main D.C. field and an auxiliary D.C. field.

The main field is energized from a D.C. source through an adjustable rheostat, at a preset value.

The auxiliary field is energized by the output of a magnetic amplifier, and normally at an intermediate value in a range of amplifier output values.

This energization of the two generator fields causes the generator to normally drive the rearward motor at a speed at which it drives the rearward conveyor at equality of speed with the forward conveyor.

A selsyn system is provided supplied with current from an A.C. source; and comprises a pair of main selsyns having a respective pair of rotors; and a pair of transformer selsyns.

The pair of main selsyn rotors are driven at speeds proportional to the speeds of the respective conveyors; and each preferably makes one revolution when the dogs on the respective conveyor move the distance from one dog to the next dog. It is an important feature that the rotors are normally in rotatively homologous positions.

The two main selsyns and the selsyn transformers are interconnected electrically, so that the selsyn transformers have respective A.C. signal output circuits, and the currents therein are at zero value when the selsyn rotors are in homologous position.

The speed of the rearward conveyor will in practice change from time to time relative to that of the forward conveyor.

It may due to some cause, slow down or speed up.

If, as an illustrative example, its speed changes to a lower speed, the main selsyns rotors are thereby displaced relatively from their homologous positions, the rotor deriving its speed from the rearward conveyor lagging behind the other rotor.

This causes A.C. signal current to flow from the transformer selsyns, and having a certain or first phase characteristic to be described hereinafter.

The signal from a first one of the selsyn transformers goes to the magnetic amplifier and effects control of its output to the auxiliary generator field. When the signal was at zero value, as referred to the amplifier had the said normal output and energized the auxiliary field at its intermediate value; but now that said signal current is flowing, it causes the amplifier output to increase and increase energization of the auxiliary field; which causes the rearward motor to speed up and speed up the rearward conveyor, and bring its speed up to equality with that of the first conveyor.

When the rearward conveyor slowed down, and in view of the premises hereof, the dogs thereon lagged behind their ideal positions. When the rearward conveyor speeds up to equality of speed with forward conveyor, this lag of the dogs is still present. The lag of the main selsyn rotor deriving its speed from the rearward conveyor also is still present, and therefore the signal to the amplifier is still flowing; and the amplifier continues to energize the auxiliary field at increased value, and the rearward conveyor continues to be driven at speed equality with that of the forward conveyor.

If the cause of slowing down of the rearward conveyor is momentary and is removed, the increased energization of the auxiliary field will be more than enough to drive the rearward conveyor at equality of speed and it will speed up faster than the forward conveyor until the selsyn rotor deriving its speed from the rearward conveyor is restored to homologous position, thereby restoring said signal to zero value, and restoring energization of the auxiliary field to its intermediate value; whereupon the rearward conveyor is again driven at the speed of the forward conveyor.

Restoring the selsyn rotors to homologous positions as here described, also restores the dogs to non-lagging positions, removing the dog-lag, as will be understood.

If the cause of the slowing down of the rearward conveyor is not temporary but persists, then the speed of the rearward conveyor will be brought back to equality with that of the forward conveyor with the said dog lag still present.

A small reduction of speed by a persisting cause, and restoring the speed to equality as described, will usually cause only a small dog lag to persist, and small dog lag or dog lag in a predetermined range is permissible.

If, as the converse example, the change of relative speed of the rearward conveyor is an increase instead of a decrease, and the selsyn rotor deriving its speed from the rearward conveyor leads the other selsyn rotor instead of lagging it, as before, then the signal current from the transformer selsyn will have a different or second phase characteristic and the amplifier signalled thereby will be caused to decrease the energization of the auxiliary field instead of increasing it as before. The end results otherwise will be the same as described above for a reduction of rearward conveyor speed.

If the speed of the rearward conveyor is caused to be so much less than that of the forward conveyor by a persisting cause that would make the lag remaining in its dogs greater than the permissible amount referred to above, another part of the control becomes effective.

This might occur for example if an operator should adjust the speed of the forward conveyor to a new higher production speed.

As referred to, the main field of the generator driving the rearward motor has a preset value cooperating with the auxiliary field as aforesaid. This other part of the control automatically increases the preset value, as follows.

The aforesaid A.C. signal circuit from the second one of the selsyn transformers goes to a twin magnetic amplifier, having two outputs energizing respectively the two differential fields and the armature of a D.C. control motor.

When the signal is at zero value as referred to, the outputs are equal and the motor fields are balanced and the motor remains at rest in a neutral position. When the signal current flows due to a difference of speed of the two conveyors, for example a signal with the first said phase characteristic due to slowing down of the rearward conveyor, the signal effects control of the twin amplifier to cause it to increase one output and decrease the other to unbalance the motor fields and rotate the control motor in a corresponding direction.

The control motor armature has mechanical connection with a rotor element of the said second selsyn transformer; and this rotor element has a position of electrical symmetry to which it can be moved to cause the signal to be brought back to zero value.

Rotation of the control motor rotates the rotor element in the direction to bring it to that position and bring the signal back to zero value, which effects a control of the twin amplifier to cause it to balance the control motor fields and bring the control motor to rest in a rotated position.

The control motor, in bringing the signal of the second selsyn transformer back to zero value will therefore rotate the selysn transformer rotor element through a rotational angle proportional to the angle of displacement of the main selsyn rotors from their homologous positions.

The angle through which the selsyn transformer rotor element is rotated by this feature of the control, is utilized to operate a visual rotary indicator of the dial type which as is believed will be understood will indicate the amount of lag of the dogs occurring on the slower conveyor.

In the illustrative example of a slowing down of the rearward conveyor momentarily as described, the main selsyn rotors are brought back into homologous positions, and the selsyn transformer signal, which was a signal having the first said phase characteristic but brought back to zero value, will thereby become a signal having the said second phase characteristic. This signal going to the twin amplifier will actuate it to cause the control motor to turn in the reverse direction, and the motor will turn the selsyn transformer rotor in the reverse direction, back to the position at which its signal is of zero value, and stop the motor again in its neutral position.

If the said selsyn rotors are not brought back to homologous position as described, the motor will remain in a rotated position and the dial will indicate the dog lag.

The control motor is mechanically connected also to a rotary limit switch. If the difference of speed of the conveyors and the corresponding lag of the dogs on the slower conveyor should be more than the said predetermined permissible maximum, causing a corresponding amount of rotation of the control motor to bring the signal back to zero value, the motor will rotate the limit switch far enough to close a main field control circuit, containing a motor which operates a rheostat in the energizing circuit of the main field, to increase the main field energization.

The main field is thus given a new higher preset value, and, aided thereby, the auxiliary field is able to speed up the slower conveyor, and then maintain equality of speed with reduced dog lag. This, by reducing the degree of displacement of the main selsyn rotors, changes the phase characteristic of the signal and causes the motor to reverse, thereby restoring the limit switch after it causes a certain increase of the main field winding to a new preset value.

The reversed control motor brings the signal to zero value by turning the transformer rotor, which stops the motor; and in its stopped position the dial indicates the remnant amount of dog lag.

In the event that an excessive difference of conveyor speed and excessive dog lag should occur, the limit switch will be turned so far as to close other limit switch contacts which operate a control to stop the faster conveyor, momentarily, until the slower conveyor has had time to be increased in speed and "catch up" with the faster conveyor.

Further, as to the signal current from either of the selsyn transformer rotors, the signal current is derived from the A.C. source as will be understood. The transformer rotor has a position of electrical symmetry at which, when the rotors of the main selsyns are in their homologous positions, the signal current is at zero value.

When the main selsyn rotor deriving its speed from the rearward conveyor lags the other rotor, an alternating signals current will flow from the transformer rotor, and it will be in phase with the A.C. of the source; and is the signal current referred to hereinbefore as having a first phase characteristic.

When the rotor deriving its speed from the rearward conveyor leads the other rotor, a signal flows from the transformer rotor that is out of phase with the A.C. source by 180 degrees, and is the signal referred to hereinbefore as having the second phase characteristic.

In either case the magnitude of the signal current will be proportional to the amount of relative lag or lead of the main selsyn rotor.

The amplifiers 21 and 89 respond differently or selectively to these signal currents of different phase characteristics, and this will be described in more detail hereinafter.

Other objects of the invention are to provide a conveyor control system having features such as those described generally above, singly and in combination.

The invention is fully described in the following description taken in connection with the accompanying drawing in which.

Figure 1:
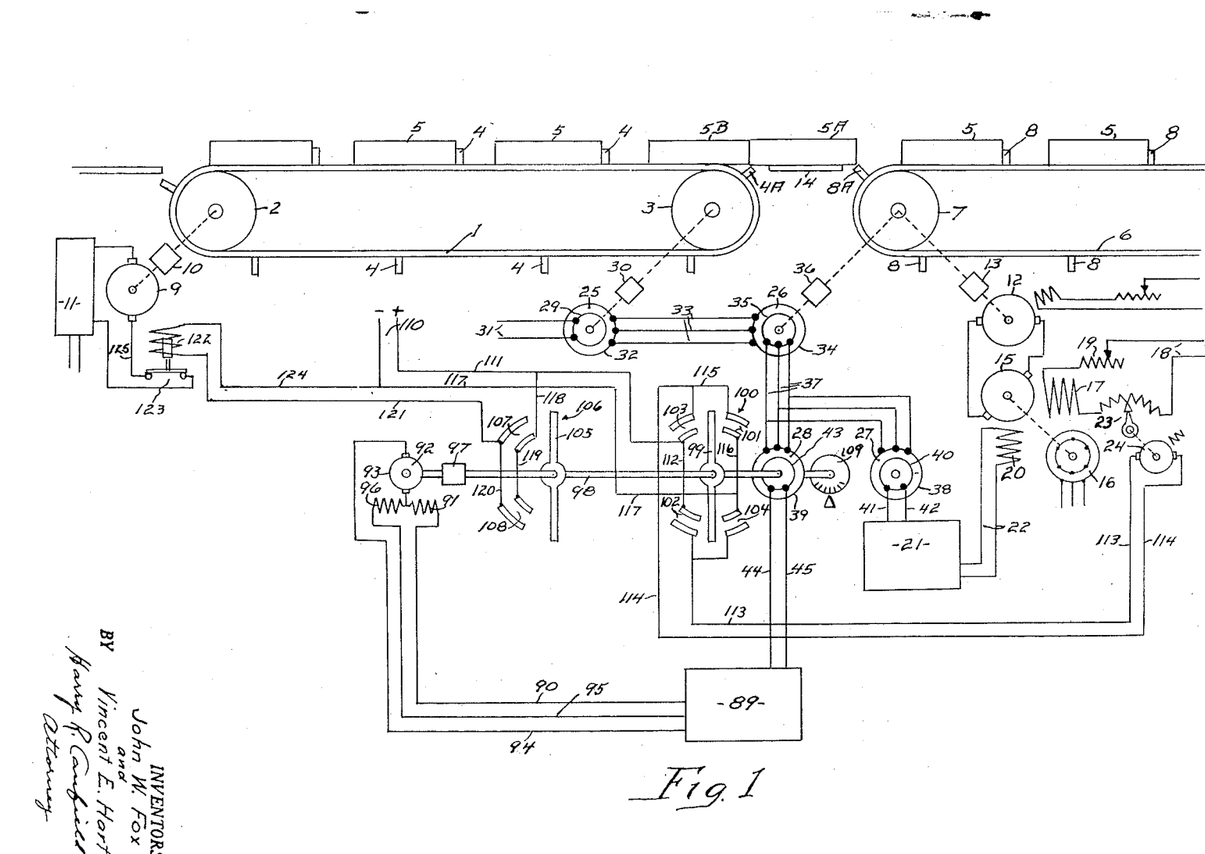
Fig. 1 is a diagrammatic view of an embodiment of the invention, and in which certain magnetic amplifiers are indicated by rectangles.

Referring to Fig. 1 of the drawing there is shown at 1 an endless belt or chain-type forward conveyor running on end rollers 2—3 and having a plurality of equally spaced dogs 4—4 thereon, each engaging and propelling a work piece 5, which, for example may be an automobile being assembled. In such illustrative example the dogs 4—4 may be 16 feet apart.

At 6 is a similar rearward conveyor running on rollers one being shown at 7 and having dogs 8—8 equally spaced the same as those on the forward conveyor, and propelling like work pieces 5—5.

The conveyors 1 and 6 are shown as simple belts, and the rollers 2—3 and 7 as having cylindrical peripheries; but this is for simplification in the drawing; and it is to be understood that the rollers will have sprocket teeth meshed with teeth on the conveyors, in a well known manner, to prevent slippage or "creep" between the rollers and the conveyors.

The forward conveyor 1 is propelled by a forward motor 9 shown diagrammatically as connected to the roller 2 through speed change gearing 10, the forward motor 9 having a controller 11 for adjusting its speed to a wanted constant production speed of the conveyor 1.

The rearward conveyor 6 is driven by a D.C. motor 12 shown diagrammatically as connected to the roller 7, through speed change gearing 13.

A rearward dog 8A propels a work piece 5A onto a transfer track 14 and then rotates downwardly away from it, releasing it, leaving it stationary on the track as at 5A.

The next following work piece 5 pushes the stationary work piece 5A ahead from the track 14 onto the forward conveyor to a pick-up position as at 5B. A dog 4A on the forward conveyor rotates upwardly and engages or picks up the work piece 5B and propels it on the conveyor 1.

In order for the work piece 5B to be always in the pick-up position, the two conveyors 1 and 6 must run at the same speed; and the dogs 8 of the rearward conveyor must be kept, ideally, at predetermined fixed distances longitudinally from corresponding dogs 4 on the forward conveyor, and not lag behind or advance beyond such positions; or if the distance varies it must be within a predetermined limited range of variation; and it is a part of the invention as stated in the premises, to accomplish this duel result.

The rearward D.C. motor 12 is energized from the output of a D.C. generator 15 driven by a substantially constant speed motor for example an induction motor 16 as shown.

The generator 15 has a main field 17 energized at a preset constant value from a source 18 of D.C. through an adjusting rheostat 19; and the generator has also an auxiliary field 20 assisting the main field and energized by the output of a magnetic amplifier indicated at 21 and to be fully described.

The output of the amplifier 21 energizes the auxiliary field 20 by a circuit 22 normally at an intermediate value, which is raised or lowered by control of the amplifier 21 to raise or lower its output.

Another rheostat 23 operated by a rheostat motor 24 readjusts the energization of the main field 17 at times and in a manner to be described, to other preset values.

A selsyn system is provided comprising a generator selsyn 25, a differential selsyn 26 and a pair of transformer selsyns 27 and 28, each comprising a stator and a rotor.

The rotor 29 of the generator selsyn 25 is mechanically connected, as shown diagrammatically, through reduction gearing 30 to the roll 3 of the forward conveyor 1, at a gear ratio that causes the rotor to make one revolution when the conveyor travels the distance between dogs 4—4. The rotor 29 is connected electrically to a source 31 of A.C.

The stator 32 of the generator selsyn 25 is electrically connected by three wires 33 to the stator 34 of the differential selsyn 26.

The rotor 35 of the different selsyn 26 is mechanically connected as shown diagrammatically, to the roll 7 of the rearward conveyor 6 through reduction gearing 36 at a gear ratio that rotates it one revolution for movement of the rearward conveyor 6 the distance between its dogs 8—8.

Three wires 37 connect the rotor 35 of the differential selsyn 26 to the stators 38 and 39 of the transformer selsyns 27 and 28.

The rotor 40 of the transformer selsyn 27 has an output signal circuit comprising wires 41—42 going to the amplifier 21 and the rotor 43 of the transformer selsyn 28 also has an output signal circuit comprising wires 44—45 going to an amplifier 89 to be referred to later.

With the dogs 8—8 of the rearward conveyor 6 in ideal positions, without lag or lead with respect to the dogs 4—4 of the forward conveyor 1, as referred to, the main selsyn rotors 29 and 35 are assumed to be in rotatively homologous positions.

The rotor 40 of the transformer selsyn 27 is fixed in a position of electrical balance or symmetry, and does not rotate. The rotor 43 of the transformer selsyn 28 while rotating or oscillating in operation to be described, is also normally in a position of electrical balance or symmetry.

With the arrangement described, and with the rotors 29 and 35 of the selsyn generator 25 and selsyn differential 26 remaining in their homologous positions while rotating, currents in the signal circuits 41—42 and 44—45 are at zero value.

If the speeds of the conveyors become unequal and thereby put the rotors 29—35 out of homologous positions, the rotor 35 will rotatively lag or lead the rotor 29, and signal currents will flow from the transformer selsyn rotors 29 and 35.

These signal currents will be alternating currents, and have a certain time-phase relation to the A.C. source 31, as follows.

If the signal current is caused by lagging of the rotor 35 behind the rotor 29 (and assuming chosen relations in the interconnections of the selsyn devices), the signal current will be in phase with the source 31.

If the signal is caused by leading of the rotor 35 ahead of the rotor 29, instead of lagging it, the signal will be 180 degrees out of phase with the source 31.

The signal currents in the said two instances will therefore be in phase opposition to each other; and in the first said instance may be referred to as having a first phase characteristic and in the second instance, a second phase characteristic.

In accordance with the invention, if the relative speed of the conveyors should change, a signal current having a corresponding phase characteristic will flow in the circuit 41—42 and actuate the amplifier 21 to cause it to change the energization of the auxiliary field 20, correspondingly, from its intermediate value, with results which will be described, after a description of the amplifier 21 itself which follows.

Figure 2:
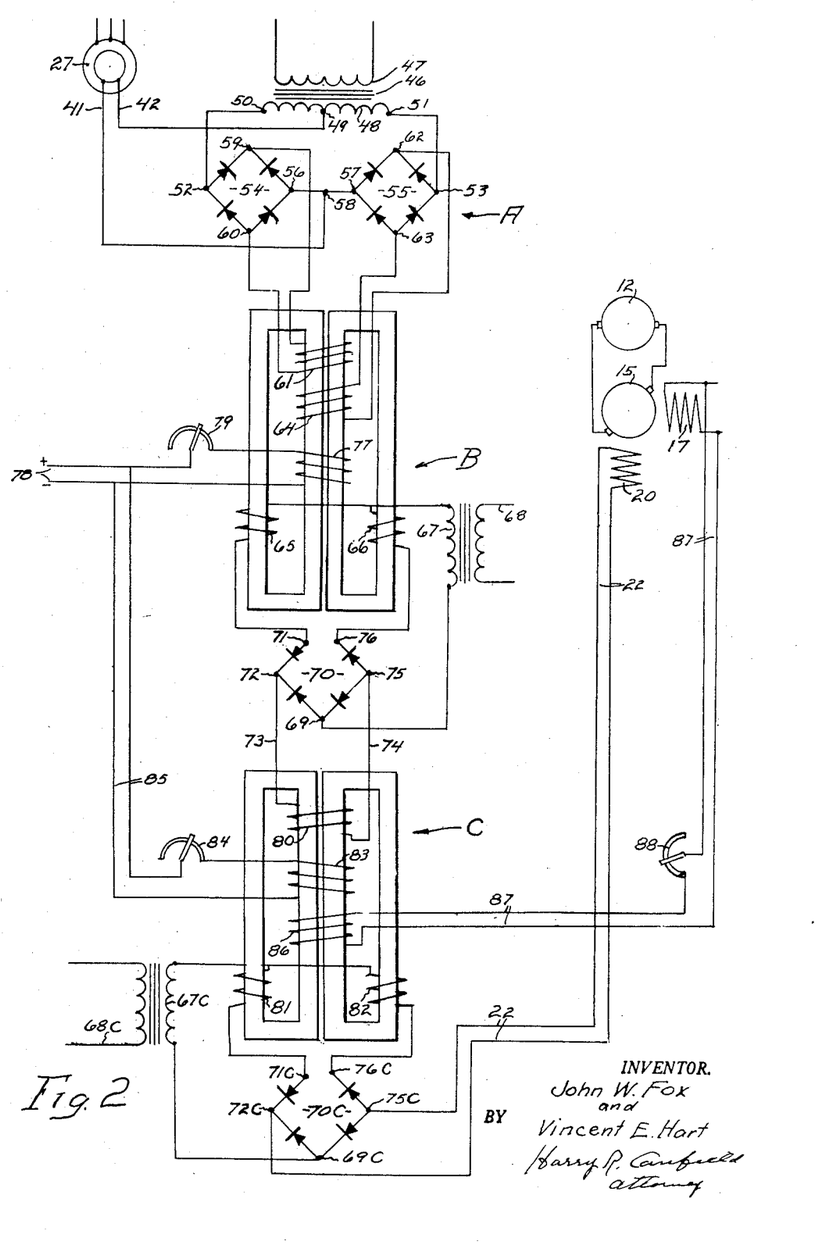
Figs. 2 and 3 are diagrammatic views, respectively, of the said magnetic amplifiers.

The magnetic amplifier 21, is shown separately in Fig. 2 wherein are also reproduced from Fig. 1, the selsyn transformer 27 and its signal circuit 41—42 and the generator auxiliary field 20 and the circuit 22 thereto, and the main field winding 17.

The amplifier 21 comprises three stages, indicated generally at A, B, and C. The output of the third stage C goes by said circuit 22 to the auxiliary field 20 and normally at an intermediate value as referred to, when the transformer selsyn signal in the circuit 41—42 is at zero value; and the output increases or decreases in accordance with transformer selsyn signals of the first or second phase characteristic.

In order for the amplifier to respond differently to these signals because of their different phase characteristics, a so-called discriminator stage is provided in the amplifier indicated generally at A.

The discriminator stage A comprises a transformer 46 having a by-phase secondary 48 the mid-point 49 of which is connected to wire 42 of the selsyn transformed signal circuit.

The opposite end points 50—51 of the secondary 48 are connected to points 52—53 of a pair of quadrilateral loop rectifiers 54 and 55, the diagonally opposite points 56—57 of the rectifiers being connected together, and connected at a point 58 to the other wire 41 of the signal circuit.

The other two diagonally opposite points 59—60 of the rectifier 54 are connected to the terminal ends of a control winding 61 on the center core of the amplifier stage B, and the corresponding points 62—63 of the rectifier 55 are connected to the terminal ends of another control winding 64 of the stage B. The control windings 61 and 64 are energized in series as will be seen and are poled to be in mutual opposition, and, being at times energized at unequal values, as will be described, may be considered as differential windings.

When current in the selsyn signal circuit 41—42 is a zero value, the transformer secondary 48 is unaffected thereby and the windings 61 and 64 are equally energized and neutralize each other, as follows.

When signal current flows, a half wave of the current may be considered as flowing from the selsyn transformer 27 by wire 42 to the point 49, and if it is of the said first phase characteristic, then a half wave of transformer current in phase therewith, will be flowing in the secondary 48, say toward the left in the drawing, from the point 51 to the point 50 and thence through winding 61 as described.

The half wave of signal current also will flow from the point 49 to the point 50 and thence by points 52, 59, winding 61, points 60, 56 and 58 and by wire 41 back to the selsyn transformer 27. The signal current thus augments the current in that part of the secondary between the points 49 and 50 and it predominates over the winding 64.

When the signal current and the transformer current then both reverse on the next half wave, the signal current and the transformer current flow in the same path as before and in the reverse direction, but due to the rectification by the rectifiers 54 and 55 the current in the windings does not reverse, and the winding 61 continues to predominate over the winding 64.

When the signal current in the circuit 41—42 is of the said second phase characteristic, displaced 180 degrees from that described above, a half wave of signal current may again be considered as flowing by wire 42 to the point 49.

The signal current is now not in phase with transformer current flowing from right to left, but is in phase with current 180 degrees later flowing from left to right.

This secondary current flows from the point 51 and thence through the winding 64 as described; and the half wave of signal current flows from point 49 to the point 51 and thence by points 53, 62, winding 64, point 63, and point 58 to wire 41, and thence back to the selsyn transformer 27. The signal current thus augments the current in that part of the transformer secondary between the points 49 and 51 and in the winding 64 and it predominates over the winding 61.

Again, when the signal current and the secondary current both reverse on the next half wave, and the current in the windings does not, the winding 64 continues to predominate over the winding 61.

The amplifier stage B has main windings 65—66, connected at their upper ends as viewed to one end of a transformer secondary 67, energized from A.C. supply mains 68.

The lower end of the secondary 67 is connected to a point 69 on a quadrilateral loop rectifier 70.

Current waves in the up direction in the secondary 67 flow down through the winding 65 to a point 71 on the rectifier, and thence to an amplifier output point 72, thence to, and back from, an output circuit 73—74 to a point 75 and thence to point 69 and back to the transformer secondary 67.

Similarly waves in the down direction flow from the secondary to the points 69—72 and to the output circuit 73—74 back to point 75 and point 76 on the rectifier and up through the winding 66 to the secondary 67.

The windings 65 and 66 are poled as usual to both produce flux in the same direction; say upwardly, in the outer cores of the amplifier and downwardly in the central core.

A bias winding 77 on the central core, always energized from a D.C. source 78 through an adjustable resistor 79 keeps the output of the amplifier at a value which may readily be raised or lowered by the net energization of the differential control windings 61 and 64.

The amplifier stage C has a control winding 80 on its central core which is energized by the output circuit 73—74 of the amplifier stage B.

It also has main windings 81—82 energized by a supply transformer secondary 67C and connected to a rectifier 70C in the same manner as described for the main windings 65—66 of the amplifier stage B like parts being indicated by the same reference characters with the suffix C.

The output circuit of the stage C from the points 72C and 75C is the circuit 22 to the auxiliary field winding 20.

A bias winding 83 for the same purpose as the bias winding 77 of the amplifier stage B is always energized from the said D.C. source 78 through an adjustable rheostat 84, by a circuit 85.

A so-called "taper" control winding 86 is provided on the amplifier stage C connected across the main generator field 17 by a circuit 87 through an adjustable rheostat 88.

The description given for Fig. 1 with the amplifier designated generally as 21, may now be completed with reference to the actual amplifier of Fig. 2.

When the signal from the transformer selsyn 27 is at zero value (under normal conditions of equal speed of the conveyors 1—6 and homologous positions for the selsyn rotors 29—35), the differential control windings 61—64 of amplifier stage B, Fig. 2, neutralize each other; the output of the amplifier stage B energizes the control winding 80 of the amplifier stage C and the output of the latter energizes the generator auxiliary winding 20 at its said intermediate value.

When the relative speeds of the conveyors changes, the rearward one, 6, slowing down or speeding up relatively and putting lag or lead in its dogs 8—8, an A.-C. signal appears in the output circuit 41—42 of the transformer selsyn 27 on one phase characteristic or the other.

This causes one of the differential windings 61 or 64 of the amplifier stage B to predominate over the other, in accordance respectively with the characteristic of the signal current as described.

If for example the winding 61 predominates because of relative decrease of speed of the rearward conveyor it will cause the output of amplifier stage B to increase, and by means of control winding 80 on the amplifier stage C cause its output to increase and the latter will increase energization of the auxiliary winding 20 with the corrective results described.

Conversely, if the other differential winding 64 predominates because of relative increase of rearward conveyor speed, the output of amplifier stage B will in like manner be decreased and decrease energization of the auxiliary field 20.

A very great change of energization of the field 20 upon the occurrence of a very small signal current results in a well known manner from the great "gain" obtained with the cascade arrangement of amplifiers B and C: resulting in instantaneous response to and correction of changes of conveyor speed.

The description of Fig. 1 referred to a signal circuit 44—45 from the selsyn transformer 28; and the parts controlled thereby will now be described.

The signal circuit 44—45 goes to a twin magnetic amplifier indicated generally as 89. The amplifier 89 has two output circuits, one by a wire 90 through one field 91 and the armature 92 of a control motor 93 and back by wire 94; the other by a wire 95 through another field 96 and the armature 92 of the motor 93 and back by wire 94. The fields 91 and 96 are differential fields, predominance of one over the other determining the direction of rotation of the armature 92, and the armature remaining at rest when the fields are energized equally.

The armature 92 of the control motor 93 rotates in alternate directions as referred to, and is connected through reduction gearing 97 to a shaft 98 and rotates or oscillates the shaft through small angles.

The shaft 98 is connected to the rotor 43 of the selsyn transformer 28 and turns it in one direction or the other from a normal position of electrical balance at which its output signal is at zero value, or returns it to said position. A dial indicator 109 connected to the rotor 43 indicates its positions.

The shaft 98 is also connected to the rotor 99 of a limit switch 100 and oscillates it in one direction to connect pairs of contacts 101 and 102 or in the other direction to connect pairs of contacts 103 and 104.

The shaft 98 is also connected to the rotor 105 of another limit switch 106 and oscillates it in alternate directions to connect respective pairs of contacts 107—108.

The said contacts of the limit switches 100 and 106 are located so that, greater oscillations of the limit switch 106 will be necessary to connect its pairs of contacts, than are required to connect the pairs of contacts of the limit switch 100.

As mentioned, the rotor 43 of the selsyn transformer 28 is normally in a position of electrical balance and when the rotors 29 and 35 of the generator selsyn and differential selsyn are in their homologous positions, signal current in the output circuit 44—45 of the transformer selsyn 28 is at zero value.

The amplifier 89 as will be described then delivers output current by wires 90—95 of equal value, to the control motor 93 and its armature 98 remains at rest in a normal neutral position.

When difference of conveyor speeds occurs putting the rotors 29—35 out of their homologous positions as referred to, signal current appears in the circuit 44—45; and is of the first or second phase characteristic, depending on whether the rotor 35 lags or leads the rotor 29, as the rearward conveyor 6 slows down or speeds up relative to the forward conveyor; as has been described.

The signal current actuates the magnetic amplifier 89 as will be described to cause its output current in one circuit 90—94 or 95—94 to increase and that in the other to decrease, energizing one differential field stronger and the other weaker, and starting the control motor 93; and the motor always turns in the direction to turn the selsyn transformer rotor 43 in the direction to bring its output signal circuit back to zero value.

This de-actuates the amplifier 89 and its outputs become balanced again and the control motor comes to rest in a position rotated away from its neutral position, with the rotor 43 rotated away from its normal position of electrical balance.

A like signal goes at the same time from the selsyn transformer 27 to the amplifier 21 as has been described and its output is actuated thereby to change energization of the auxiliary field 20 to restore equality of conveyor speeds.

As described, in a first condition of operation restoring of equality of speed is accompanied by return of the selsyn rotors 35, and 29 to homologous positions; and in a second condition of operation, when, say the rearward conveyor has slowed down, it is returned to equality of speed but the rotor 35 lags behind the rotor 29.

In the first condition of operation, and when the control motor as described has turned to a rotated position away from its neutral position and correspondingly positions the rotor 43 of the transformer selsyn away from its normal position of electrical balance to bring its signal current back to zero value, if the signal current from the rotor 43 had been one of the first phase characteristic before it was brought back to zero, then returning the rotors 35—39 to homologous positions will cause signal current to be of the second phase characteristic.

This will actuate the amplifier 89 to drive the motor 93 in the reverse direction until it again restores the signal current to zero value and the rotor 42 will be restored to its normal position of electrical balance and the motor armature restored to its neutral position.

In this position of the motor armature the dial 109 will indicate no lag in correspondence with the fact.

In the second condition of operation, upon restoring of equality of conveyor speed and, say with the rotor 35 lagging the rotor 29 with corresponding dog lag present, the control motor armature 92 will have rotated the selsyn transformer rotor 43 to a position at which its signal current comes to zero and the motor armature remains in that position and the dial 109 indicates the dog lag.

If the signal current from the selsyn transformer 39 to the amplifier 90 had been one of second phase characteristic instead of first phase characteristic, caused by a corresponding difference of conveyor speeds, the operation just described would be the same except that the movements of the motor armature 92 and the selsyn transformer rotor 43 would be in the opposite directions from that described.

The operations just described including oscillation of the shaft 98, or for example rotation of the shaft in one direction due to restoring of equality of conveyor speed, and lagging of the dogs 8—8, are idle operations, so long as the dogs do not lag beyond a predetermined permissible amount, say 3 inches, and so long as the shaft 98 correspondingly does not rotate more than a corresponding predetermined maximum amount.

Upon greater than this maximum dog lag, which might be caused by an operator by increasing the production speed of the forward conveyor, the shaft 98 will turn the limit switch element 105 far enough before the motor armature is brought to rest, to connect the pairs of contacts 101 and 102.

A circuit is thereby closed from a source of D.C. at 110, by wires 111 and 112 through contacts 102, by wire 113 through the rheostat motor 24, and back by wires 114 and 115, through contacts 101 and by wires 116 and 117 back to the source 110.

The rheostat motor 24 then operates the rheostat 23 in the direction to increase energization of the main field 17.

The effect of increase field 17 additional to the field 20, again establishes speed equality but with some of the dog lag removed; and with less lag of the rotor 35; and the latter, as described causes the rotor 43 to deliver a signal of the opposite phase characteristic which causes the amplifier 89 to reverse the motor 93 and the motor will rotate back to a position at which it brings the signal current to zero and itself comes to rest, and at which it restores the limit switch. The dial 109 then indicates the reduced dog lag.

It will be apparent that if the difference in conveyor speed was caused by slowing down of the forward conveyor, it will be the pairs of contacts 102—103 of the limit switch that close, and the rheostat motor 24 will set the main field 17 at a new lower preset value.

In an extreme instance, assuming that the forward conveyor is speeded up so much that the leg of the dogs 8 on the rearward conveyor lag an extreme amount, for example eleven inches, the shaft 98 will rotate so far as to operate the limit switch 106, moving the rotary element 105 to connect the pair of contacts 108. This closes a circuit from the D.C. source 110 by wires 111—118—119, through contacts 108 and by wires 120—121, through the winding 122 of a circuit breaking contactor 123 and back by wire 124 to the source 110; the contactor 123 operating and opening the circuit 125 energizing the motor 9. This stops the forward conveyor. The control as described goes on speeding up the rearward conveyor until the extreme departure from homologous positions of the rotors 29 and 35 of the generator and differential selsyns, is overcome, and the shaft 98 is turned by the motor 93 back to restore the limit switch 106 and this closes the circuit breaker 123 and the forward conveyor starts up again; and the speeds of the conveyors are then regulated to equality.

The response of the magnetic amplifier 89 Fig. 1, as described generally above will now be described in more detail in connection with Fig. 3 wherein it is shown separately and wherein are also reproduced from Fig. 1, the transformer selsyn 28 and the signal circuit 44—45 from its rotor 43 to the amplifier and the control motor 93, and the circuit wires 90—94—95 from the amplifier to the motor.

Figure 3:
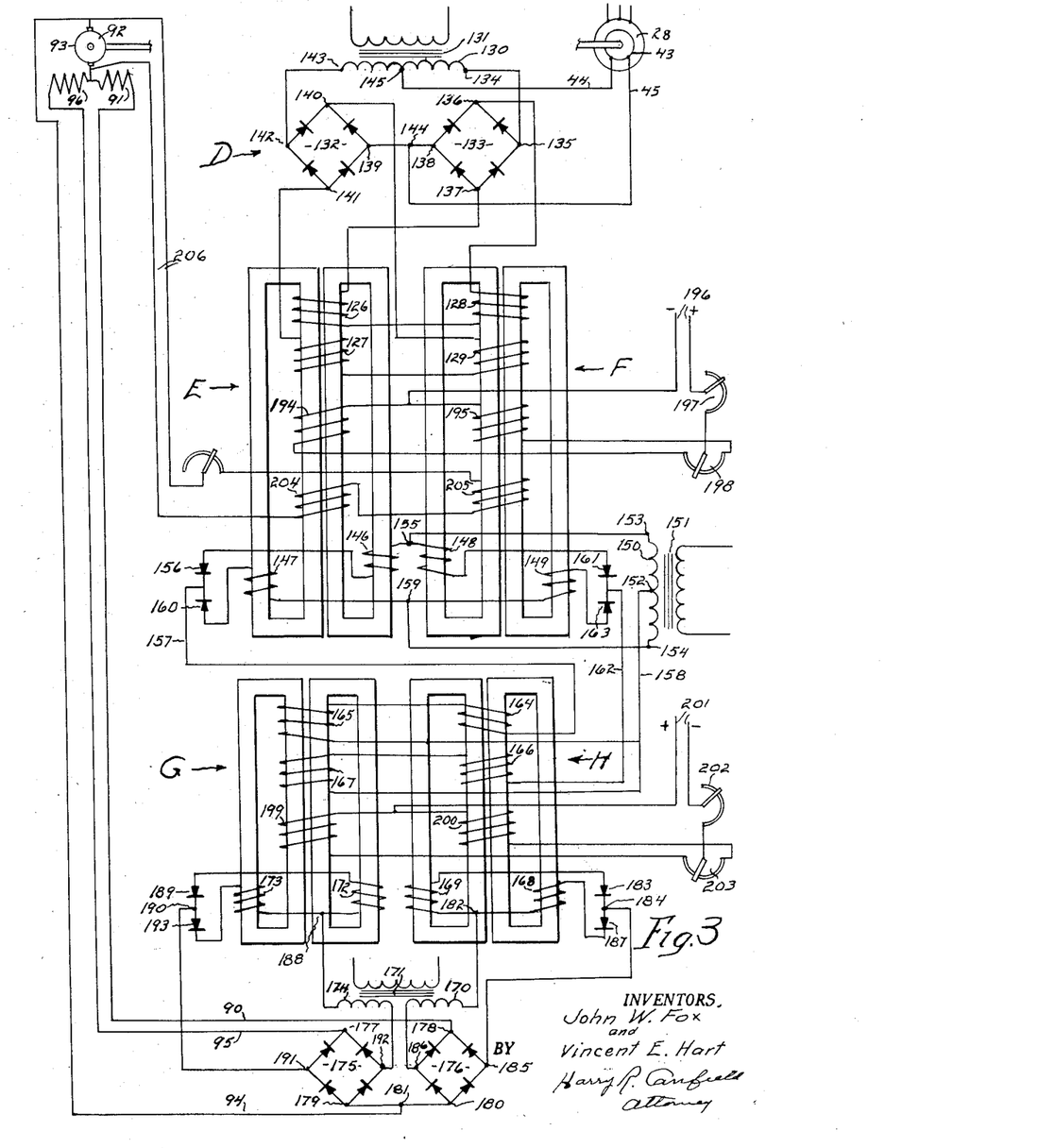

The amplifier of Fig. 3 comprises a discriminator stage indicated generally at D; left and a right first stage amplifiers, E and F; left and right second stage amplifiers G and H.

The amplifiers E and F have respectively pairs of differentially opposed control windings 126—127 and 128—129; supplied with rectified current from the secondary 130 of a transformer 131, through quadrilateral loop rectifiers 132—133, and influenced by signals in the wires 44—45 from the transformer selsyn 28.

It will be seen that the arrangement of the secondary, 130 and rectifiers 132—133 is generally the same as that fully described for Fig. 2 and it will therefore be apparent that the path of positive half waves of secondary current from point 134 to point 143 of the secondary will be through windings 129, 127, 128, 126 in series in the order named; and negative half waves from point 143 to point 134 will flow through windings 128, 126, 129, 127 in series in the order named; and that the current does not reverse in the windings.

The windings 128 and 127 are poled to always produce magneto motive force upwardly as viewed, and the windings 129 and 126 downwardly. When the selsyn transformer signal current is at zero value the pair of windings 128 and 129 neutralize each other, and the pair of windings 126 and 127 neutralize each other.

The signal circuit wire 45 is connected by way of a point 144 with the points 138—139, and the signal wire 44 is connected to the mid point 145 of the secondary.

As referred to, the amplifier of Fig. 3 is caused to respond differently to signal currents of the first phase and second phase characteristics. This is effected by the discriminating stage D as follows.

In a manner similar to that described for Fig. 2, signal current of the said first phase characteristic, flowing by wire 44 from the selsyn transformer 43 to the point 145 and from the point 144 by wire back to the transformer selsyn, augments the current flowing from right to left in the secondary part 145—143 and in the windings 129 and 127; and winding 127 then predominates over winding 126 and produces magneto motive force upward in the center core of the amplifier E; and winding 129 predominates over winding 128 and produces magneto motive force downward in the center core of amplifier F.

Also, similarly as described for Fig. 2, signal current of the said second phase characteristic in the signal circuit 44—45, augments the current flowing from left to right in the secondary part 145—134 and in the windings 128—126; and winding 128 predominates over winding 129 and produces magneto motive force in the upward direction in the center core of amplifier F; and winding 126 predominates over winding 127 and produces magneto motive force in the downward direction in the center core of amplifier E.

Thus in terms of flux in the central cores of amplifiers E and F, the flux is down in F and up in E for signal current of one phase characteristic, and up in F and down in E for signal current of the other phase characteristic.

When the current reverses in the secondary and flows toward the left, the polarity of all of the windings 126 to 129, remains the same and since the signal current also reverses, the differential effect of the windings is the same as before.

The left amplifier E has main windings 146—147 on its outer cores, and the right amplifier F has corresponding main windings 148—149; all energized by input from the secondary 150 of a transformer 151, having a mid point 152 and end points 153—154.

At the left amplifier E, current flowing upwardly, as viewed, in the secondary 150, goes from point 153 to a point 155 through winding 146 and a rectifier 156 to an output main 157 and thence back by an output main 158 to the mid point 152; and current downward in the secondary goes by point 154 to a point 159 through winding 147 and a rectifier 160 to output main 157 and back by output main 158 to the mid point 152.

At the right amplifier F, current flowing upwardly in the secondary 150 goes from point 153 to point 155, through winding 148 and a rectifier 161 to an output main 162 and back by output main 158 to secondary mid point 152; and current downward in the secondary goes by point 154 to point 159 through winding 149 and a rectifier 163 to output main 162 and back by output main 158 to the secondary mid point 152.

The windings 146 to 149 are all poled so that flux therefrom is upward in the outer cores.

Current in the output mains 157—158 and 162—158 is control current for the second stage G—H. Current in the output mains 157—158 of the left amplifier E goes through a control winding 164 of the right amplifier H and a control winding 165 of the left amplifier G. Current in the output mains 162—158 of the right amplifier E goes through a winding 166 of the right amplifier H and through a winding 167 of the left amplifier G.

Magneto motive force of windings 164 and 167 is downward as viewed; and of windings 166 and 165 is upward. Winding 164 is therefore poled to oppose winding 166 and winding 165 is poled to oppose winding 167.

As described for amplifiers E and F with a signal of the first phase characteristic, the resultant magneto motive force of its differential control windings 128—129 is in the direction to increase the output of amplifier F; and that of the windings 126—127 of amplifier E is in the direction to decrease its output.

The windings 166—167 of the amplifiers H and G will thereby be strongly energized and the windings 164—165 weakly energized, and the winding 166 will predominate over the winding 164 and produce resultant magneto motive force in the up direction; and the winding 167 will predominate over the winding 165 and produce resultant magneto motive force in the down direction.

The amplifier H has main windings 168—169; energized from one secondary 170 of a transformer 171; and the amplifier G has main windings 172 and 173 energized from another secondary 174 of the transformer 171.

A pair of quadrilateral loop rectifiers 175—176 have points 177—178 connected respectively to the wires 90 and 95 going to the differential fields 91 and 96 of the control motor 93, and have diagonally opposite points 179 and 180 connected together and to a point 181 connected to the return wire 94 from the motor 93.

The wires 90—94 constitute the ultimate output circuit or load circuit of the amplifier H as follows.

Current toward the right in secondary 170 goes to a point 183, through winding 169 and a rectifier 183 to an output point 184 and to a point 185 on rectifier 176 and thence to output wire 90; and back by wire 94 to points 181—180 to a point 186 and back to the secondary.

Current toward the left in secondary 170 goes to points 186—178 and wire 90 and back by wire 94 to points 181, 180, 185 and 184 through a rectifier 187 and winding 168 to point 182 and back to the secondary.

The wires 95—94 constitute the output load circuit of the amplifier G as follows.

Current toward the left in secondary 174 goes to a point 188 and through winding 172 and a rectifier 189 to an output point 190 and to a point 191 on rectifier 175 to point 177 to wire 95 and back by wire 94 to points 181 and 179 to a point 192 and back to the secondary.

Current toward the right in secondary 174 goes to points 192 and 177 to wire 95 and back by wire 94 to points 181, 179, and 191 to point 190, through a rectifier 193 and winding 173 to point 188 and back to the secondary.

The main windings 168, 169, 172, 173 are all poled to produce flux in the downward direction.

The resultant magneto motive force of the differential windings 164 and 166 as described is in the direction to increase the output of amplifier H, and that of the windings 165—167 is in the direction to decrease the output of amplifier G.

Accordingly the field 96 of the control motor 93 will be weakened by the circuit 95—94, and the field 91 strengthened by the circuit 90—94, and the motor will run in a corresponding direction.

It is to be noted that, in the absence of signal current in the wires 44—45 of the transformer selsyn 28, that is when the current is normally at zero value as referred to, the differential control windings on the amplifiers E to H will be mutually neutralized, and the outputs of the amplifiers will be at some intermediate value; and that the outputs of the amplifiers G and H will be equal and energize the control motor fields 96 and 91 equally, and that they will neutralize each other and the motor will remain at rest.

The foregoing description applies to a phase signal of the first characteristic from the transformer selsyn 28. It is believed to be apparent without further description that the motor 93 will be operated in the reverse direction if the signal is of the second phase characteristic.

As described for Fig. 2, the auxiliary field 20 is normally energized at an intermediate value, above and below which it is uniformly varied by signals, amplified through the amplifiers B and C: and it is accordingly desirable to have the outputs of these amplifiers normally at intermediate value capable of being uniformly raised and lowered; and this is provided in the amplifiers as described.

In Fig. 3 the amplifiers E and F, have bias windings 194 and 195 for a like purpose, energized from a D.C. source at 196, both adjustable simultaneously by a rheostat 197 and adjustable relative to each other by a potentiometer 198; and the amplifiers G and H also have bias windings 199—200 for this purpose, energized from a D.C. source 201, adjustable in unison by a rheostat 202 and relatively by a potentiometer 203.

As described for Fig. 1, the main generator field 17 may be energized at high values or low values, for high or low conveyor speed respectively. In either case, the change in the energization of the auxiliary winding 20 to correct a given amount of departure from speed equality, will be the same.

When the main field 17 has high energization, this change of energization of the auxiliary field, will make only a small percentage of change of the total field energization by the two fields 17 and 20, but when the energization of the field 17 is low, it will make a large percentage of change in the total energization, and a corresponding sudden jump in speed of the motor 12; which may be undesirable in practice.

Means is therefore provided by which when the energization of field 17 is low, the change in energization of the field 20 will be reduced, and vice versa when the energization of field 17 is high, whereby in either case, the motor speed will not be changed abruptly.

This is done as shown in Fig. 2 by a bias winding 86 on the amplifier C energized by a circuit 87 connected across the main field 17 and therefore energized proportionally to the energization of the main field.

In Fig. 3, the amplifiers E and F have bias windings 204-205 respectively, in series in an energizing circuit 206 connected across the armature 92 of the control motor 93, and adjustable by a rheostat 207.

These bias windings are thus energized proportionally to the speed of the control motor, and are poled to reduce the output of the amplifiers E and F as the motor speed increases, and thereby prevent excessive motor speeds, and stabilize the motor operation.

We claim:

1. In a conveying apparatus of the type in which work pieces are conveyed by a rearward conveyor and onto a forward conveyor; an electric motor driving one conveyor; power means driving the other conveyor; dogs fixed on the conveyors, respectively, engaging the work pieces to position them thereon and to propel them in unison therewith; a control comprising a first and a second winding, energization of which jointly control the speed of the motor; the first winding being constantly energized at a fixed preset value; and a controller variably energizing the second winding responsive to changes of motor speed to maintain the speed constant at a normal constant speed value; and control means responsive to the lag or lead of the dogs on the motor driven conveyor caused by change of speed thereof, to change the said preset value of the first winding and maintain it continuously at a new preset value, to restore the conveyor to said normal speed and remove the lag or lead of the dogs.

2. An apparatus as described in claim 1 and in which the control comprises an electric generator and the motor is energized by the output of the generator; and the first and second windings are field windings of the generator; and the second winding is energized normally at an intermediate value; and upon occurrence of a change of speed of the one conveyor, the energization of the motor is changed by a change of energization of the said second field winding to values above or below the intermediate value.

3. In a conveying apparatus of the type in which work pieces are conveyed by a rearward conveyor and onto a forward conveyor; an electric motor driving one conveyor; power means driving the other conveyor; dogs fixed on the conveyors, respectively, engaging the work pieces to position them thereon and to propel them in unison therewith; a controller actuable to vary the energization of the motor to increase or decrease its speed, and normally energizing it to maintain equality of speed of the conveyors; control means responsive to a change of speed of the one conveyor accompanied by a lag or lead of the dogs of the one conveyor relative to the dogs of the other conveyor, and actuating the controller to cause it to change energization of the motor commensurably with the amount of the said lag or lead of the dogs, to restore equality of speed of the conveyors, the control comprising main selsyn devices having rotors driven at speeds proportional to the speeds of the respective conveyors; and the rotors being disposed in homologous positions when the dogs of the one conveyor are without lag or lead; and the main selsyn devices having a single output energizing a static transformer selsyn device which delivers an alternating current signal current; the devices being electrically interconnected so that when the main selsyn rotors are driven at the same speed and remain in homologous positions the value of the signal current is zero; and when the rotors are displaced from homologous positions by a change of speed of the one conveyor, signal current is delivered and has one or the other of two opposite phase characteristics in dependence upon the sense of the speed change of the one conveyor; the energization of the motor being changed responsive to changes of energization of a winding; and the winding being energized by the output of a magnetic amplifier energized from a source of current; and the magnetic amplifier having a control winding means for controlling its output; and the control winding means being connected to be energized from a source of current, and the energization of the control winding means being varied to change the amplifier output by the signal current, and to cause the output to be increased or decreased in dependence upon the phase characteristic of the signal current.

4. In a conveying apparatus of the type in which work pieces are conveyed by a rearward conveyor and onto a forward conveyor; an electric motor driving one conveyor; power means driving the other conveyor; dogs fixed on the conveyors, respectively, engaging the work pieces to position them thereon and to propel them in unison therewith; a controller actuable to vary the energization of the motor to increase or decrease its speed, and normally energizing it to maintain equality of speed of the conveyors; control means responsive to a change of speed of the one conveyor accompanied by a lag or lead of the dogs of the one conveyor relative to the dogs of the other conveyor, and actuating the controller to cause it to change energization of the motor commensurably with the amount of the said lag or lead of the dogs, to restore equality of speed of the conveyors, the control comprising main selsyn devices having rotors driven at speeds proportional to the speeds of the respective conveyors; and the rotors being disposed in homologous positions when the dogs of the one conveyor are without lag or lead; and the main selsyn devices energizing a transformer selsyn device which delivers an alternating current signal current; the devices being electrically interconnected so that when the main selsyn rotors are driven at the same speed and remains in homologous positions, the value of the signal current is zero; and when the rotors are displaced from homologous positions by a change of speed of the one conveyor, signal current is delivered and has one or the other of two opposite phase characteristics in dependence upon the sense of the speed change of the one conveyor; and the transformer selsyn device having a rotor which when rotated through an angle corresponding to the amount of the said lag or lead of the dogs of the one conveyor, brings the signal back to zero value; a control motor connected to the rotor of the transformer selsyn to rotate it; a magnetic amplifier, energized from a current source, and having two outputs connected to the control motor to drive it in alternate directions, in dependence upon predominance of one output over the other; and the amplifier having control winding means energized from a current source and the energization thereof being varied by the signal current to cause the two outputs to be equal and thereby cause the motor to be at rest, when the signal is at zero value, or to cause one output to predominate over the other in dependence upon the phase characteristic of the signal current; to rotated the control motor in one direction or the other; whereby the signal from the selsyn transformer causes the control motor to run and rotate through a rotational angle that brings the signal back to zero and stops the control motor, and the rotational angle corresponds to the amount of the said lag or lead of the dogs; and a rotary dial indicator is rotated by the control motor through said rotational angle to indicate the lag or lead of the dogs.

5. An apparatus as described in claim 1 and in which the control means comprises main selsyn devices having rotors driven at speeds proportional to the speeds of the respective conveyors; and the rotors are disposed in homologous positions when the dogs of the one conveyor are without lag or lead; and the main selsyn devices differentially energize a transformer selsyn device which delivers an alternating current signal current; the devices being electrically interconnected so that when the selsyn rotors are driven at the same speed and remain in homologous positions, the value of the signal current is zero; and when the rotors are displaced from homologous positions by a change of speed of the one conveyor, signal current is delivered and has one or the other of two opposite phase characteristics in dependence upon the sense of the speed change of the one conveyor; and in which the energization of the motor is dependent upon the energization of two windings, a main winding energized at a constant preset value and an auxiliary winding energized by the control means commensurably with the amount of said lag or lead of the dogs to restore equality of the conveyor speeds when they depart from equality; and in which the transformer selsyn device has a rotor which when rotated through an angle corresponding to the amount of the said lag or lead of the dogs of the one conveyor, brings the signal back to zero value; and a control motor is connected to the rotor to rotate it; and a magnetic amplifier, energized from a current source, is provided having two outputs connected to the motor to drive it in alternate directions, in dependence upon predominance of one output over the other; and the amplifier has control winding means energized from a current source and the energization thereof is varied by the signal current to cause the two outputs to be equal and thereby cause the motor to be at rest when the signal is at zero value, or to cause one output to predominate over the other in dependence upon the characteristic of the signal current; to rotate the motor in one direction or the other; whereby the signal from the selsyn transformer causes the motor to run and rotate through a rotational angle that brings the signal back to zero and stops the motor; and the rotational angle corresponds to the amount of the said lag or lead of the dogs; and in which a limit switch is provided operable by the control motor when its rotational angle is excessive due to dog lag or lead more than a predetermined amount; and operation of the limit switch energizes an auxiliary motor causing it to start and run and operate a device that changes the preset energization of the main winding, to a new value; the speed of the motor driving the one conveyor being changed to equality of speed at reduced lead or lag of the dogs; and the selsyn transformer signal being thereby caused to reverse its phase characteristic, which causes the control motor to reverse and bring the signal back to zero and restore the limit switch, leaving the main winding energized at its new preset value.

6. In connection with a conveying apparatus, of the type comprising a pair of conveyors and respective motors propelling them normally at equal speeds; a pair of selsyn devices comprising rotors; means rotating the rotors respectively at speeds proportional to the speeds of the respective conveyors; and the rotors having normally rotatively-homologous positions; a control actuated in response to rotation of the selsyn rotors out of their homologous positions by a change of speed of one conveyor relative to that of the other; the control comprising a first means correctively changing the speed of the one motor driving the one conveyor to restore equality of conveyor speeds and the control also comprising a second means to restore the rotors to their homologous positions; the second means comprising a second winding controlling the speed of the motor and constantly energized at a preset value, and the first means comprising a first winding supplementing the second winding, whereby the two windings jointly control the speed of the motor; and the first means energizing the first winding normally at an intermediate value and changing its energization to be above or below the intermediate value as the speed of the one conveyor tends to change; and the second means changing the energization of the second winding to a new preset value and maintaining it constantly at that new value.

7. In a conveying apparatus a pair of conveyors and respective motors propelling them normally at equal speeds; a generator selsyn, and a differential selsyn comprising respective rotors driven at speeds proportional to the speeds of the respective conveyors; the rotors being normally in homologous positions; a transformer selsyn; the differential selsyn being electrically connected with the generator selsyn and with the transformer selsyn; the generator selsyn being energized from an alternating current source; the transformer selsyn having an alternating current output signal circuit in which signal current flows with one or the other of two opposite phase characteristics when the said homologous positions of said rotors are disturbed by the occurrence of a relative decrease or increase of speed of the conveyor propelled by one of the motors; control means actuated by the signal current to change the speed of said one motor; and the control means responding selectively to the said phase characteristics of the signal current, to effect increase or decrease of the said one motor speed to restore equality of conveyor speed.

8. An apparatus as described in claim 7, and in which the said one motor derives power from an electric generator having a variable output, and in which, the output is varied by varying the energization of field winding means of the generator, and the field winding means comprises the said first and second windings.

9. In a conveying apparatus a pair of conveyors and respective motors propelling them normally at equal speeds; a generator selsyn, and a differential selsyn, comprising respective rotors driven at speeds proportional to the speeds of the respective conveyors; the rotors being normally in rotatively homologous positions; a first and a second transformer selsyn; the differential selsyn being electrically connected with the generator selsyn and with both transformer selsyns; the generator selsyn being energized from an alternating current source; the transformer selsyns having respective alternating current output signal circuits in each of which signal current flows with one or the other of two opposite phase characteristics when the said rotors are rotatively displaced from their homologous positions by the occurence of a relative decrease or increase of speed of the conveyor propelled by one of the motors; the said one motor deriving power from a generator having a main field energized at a fixed preset value and an auxiliary field normally energized at an intermediate value; a first control means actuated by the signal current from the first transformer selsyn and responding selectively to the phase characteristic thereof to effect energization of the auxiliary field above or below the intermediate value to increase or decrease the speed of said one motor to restore equality of conveyor speed upon a departure from equality; a second control means actuated by signal current from the second transformer selsyn and responding selectively to the phase characteristics of the signal current when the said rotors have been displaced from their homologous positions by rotative displacement greater than a predetermined maximum extent, to change the energization of the main field to a higher or lower fixed preset value, in correspondence with the increased or decreased energization of the auxiliary field.

10. In an apparatus comprising two rotary mechanism elements, an electric motor driving one, and means driving the other at a predetermined speed; a speed control for the motor maintaining equality of speeds of the rotary mechanism elements as their relative speed tends to vary; and comprising a controller supplied with current from a source and having an output, and comprising a winding energized by the controller output at an intermediate value at equality of speed, and causing the motor speed to increase or decrease when energized above or below the intermediate value; an alternating current signal circuit actuating the controller to cause it to increase or decrease energization of the winding, in correspondence with one or the other of two opposite phase characteristics of the signal circuit current; means comprising two rotary elements driven at speeds proportional to the speeds of the respective mechanism elements and supplied with current from a current source and having jointly a single output circuit supplying energizing current to the signal circuit only when the two rotary elements are displaced from normal homologous positions by a decrease or increase of speed of the motor driven mechanism element; and means causing the phase of the current supplied to the signal circuit to have one or the other of said phase characteristics when the speed of the one mechanism element becomes less or greater than that of the other.

11. An apparatus as described in claim 10, and in which the said two rotary elements are the rotors of respective selsyn devices, having stators electrically connected, and one rotor receives the supplied alternating current, and the other rotor transmits alternating current to the stator of a transformer selsyn device whose rotor is stationary and connected to the signal circuit and the said single output circuit supplying current to the signal circuit is the output from the rotor of the transformer selsyn device.

12. In an apparatus comprising a pair of conveyors, propelled by power, normally at equal speeds, one of them propelled by a motor, driven by the output of a generator, having a field winding; a pair of selsyn devices comprising rotors driven at speeds proportional to the speeds of the respective conveyors and having homologous positions when the conveyors have equal speeds; signal circuit means deriving signal current from the selsyn devices, which, when the selsyn device rotors are in homologous positions, is of zero value, and which when the rotors are out of homologous positions, caused by a change of speed of the motor driven conveyor relative to the other, is of a value proportional to the difference of speed, and of a first characteristic when the difference in speed is due to a decrease of speed of the motor driven conveyor and of a second characteristic when due to an increase of speed thereof; a control comprising a magnetic amplifier having an output energizing the generator field; and having control winding means receiving current from said signal circuit means, and responsive thereto to energize the field winding at an intermediate value when the signal current is at zero value and to increase the field winding energization above said intermediate value when the signal current is of said first characteristic, and to decrease it below said intermediate value when the signal current is at said second characteristic.

References Cited in the file of this patent

UNITED STATES PATENTS

| | | |
|---|---|---|
| 1,899,595 | Snyder et al. | Feb. 28, 1933 |
| 2,117,484 | Lewellen et al. | May 17, 1938 |
| 2,488,412 | King et al. | Nov. 15, 1949 |
| 2,519,339 | Avery | Aug. 22, 1950 |
| 2,808,922 | Lutman | Oct. 8, 1957 |